US008358316B2

(12) United States Patent
Dollner

(10) Patent No.: US 8,358,316 B2
(45) Date of Patent: Jan. 22, 2013

(54) PROCEDURE AND DEVICE FOR THE TEXTURIZING OF AN OBJECT OF A VIRTUAL THREE-DIMENSIONAL GEOMETRIC MODEL

(75) Inventor: Jurgen Dollner, Berlin (DE)

(73) Assignee: Autodesk, Inc., San Rafael, CA (US)

( * ) Notice: Subject to any disclaimer, the term of this patent is extended or adjusted under 35 U.S.C. 154(b) by 942 days.

(21) Appl. No.: 12/267,341

(22) Filed: Nov. 7, 2008

(65) Prior Publication Data

US 2009/0189888 A1  Jul. 30, 2009

(30) Foreign Application Priority Data

Nov. 7, 2007 (EP) .................................... 07021626

(51) Int. Cl.
*G06T 15/00* (2011.01)
*G06T 15/04* (2011.01)
(52) U.S. Cl. ........................................ 345/582; 345/583
(58) Field of Classification Search .................. None
See application file for complete search history.

(56) References Cited

U.S. PATENT DOCUMENTS

| | | | | |
|---|---|---|---|---|
| 6,650,327 | B1 * | 11/2003 | Airey et al. | 345/520 |
| 6,744,442 | B1 * | 6/2004 | Chan et al. | 345/587 |
| 7,102,636 | B2 * | 9/2006 | Reshetov et al. | 345/420 |
| 2005/0128212 | A1 * | 6/2005 | Edecker et al. | 345/582 |
| 2005/0285856 | A1 * | 12/2005 | Gruntjens | 345/419 |

OTHER PUBLICATIONS

Snavely et al., "Photo Tourism: Exploring Photo Collections in 3D," Jul. 2006, ACM, col. 25, Issue 3, pp. 841-842.*

* cited by examiner

*Primary Examiner* — Jeffrey Chow
*Assistant Examiner* — Andrew G Yang
(74) *Attorney, Agent, or Firm* — Fish & Richardson P.C.

(57) ABSTRACT

A procedure for texturing an object of a virtual three-dimensional geometric model represented by three-dimensional geometric model data comprised of a three-dimensional object data associated with the object. Facet data is created out of three-dimensional geometric model data representing object surfaces of an object and which will be assigned 3D object data. Texture data is created representing a surface texture of the object surfaces of each object and which is assigned facet data. The three-dimensional object data, facet data and texture data are used to create a textured, three-dimensional representation of the object.

21 Claims, 4 Drawing Sheets

PROCEDURE AND DEVICE FOR THE TEXTURIZING OF AN OBJECT OF A VIRTUAL THREE-DIMENSIONAL GEOMETRIC MODEL

RELATED APPLICATION DATA

The present application claims priority to European Patent Application No. 07021626.2, filed on Nov. 7, 2007 having the title "Verfahren und Vorrichtung zum Texturieren eines Objektes eines virtuellen dreidimensionalen geometrischen Modells", with inventor Mr. Jürgen DÖLLNER, the contents of which are incorporated by reference as if set forth fully herein.

FIELD

Apparatuses, methods, and computer program products for the texturing of an object of a virtual three-dimensional geometric model as well as a computer program product.

BACKGROUND

In addition to triangle based rendering, texturing is a fundamental computer graphic operation. Texture data are generally represented as 2 or 3 dimensional raster or volume data. Computer graphic models being textured require texture coordinates, which are either defined explicitly as part of a model description (texture coordinates for each corner of a geometric model), implicitly from the model geometry, for example two-dimensional surface parameterization, or procedurally, for example in the case of projective textures. The texturing data utilized in the texturizing process are either of a synthetic or a photographic nature. Data of different origin can be combined as well. Spatially localized image data as created in the capture of aerial pictures, for example, can be prepared for texturing by manually or semi automatically cutting out image sections and afterward equalizing them in regard to perspective and geometry.

SUMMARY

Apparatuses, methods, and computer program products for the texturing of an object of a virtual three-dimensional geometric model using spatially localized image data, allowing the texturizing of three-dimensional geometric models in an efficient manner, in particular time efficiently and with reduced data processing effort.

According to one aspect there is disclosed a method for the texturing of an object of a virtual three-dimensional model represented by three-dimensional geometric model data comprising three-dimensional object data corresponding to the object. The method includes creating facet data from three-dimensional geometric model data, which represent the object surfaces of the object and which are then corresponding to the 3D object data, generating texture data representing a surface texture for each object surface of the object and which corresponds to the facet data, and furnishing three-dimensional object data, facet data and texture data for the textured three-dimensional representation of the object. Generating the texture data can include discretizing the object surfaces by creating surface fragments corresponding to the surfaces of the object, generating a fragment color value for the surface fragments by projecting the surface fragments into a projection area of a spatially localized set of image data representing one or multiple captured images with the object and corresponding to the virtual three-dimensional geometric model, and by deducting the fragment color value from the color information of the respective projection area; and calculating of the texture data based on the fragment color values assigned to the surface fragments of the object surfaces.

DETAILED DESCRIPTION

Figure 1:
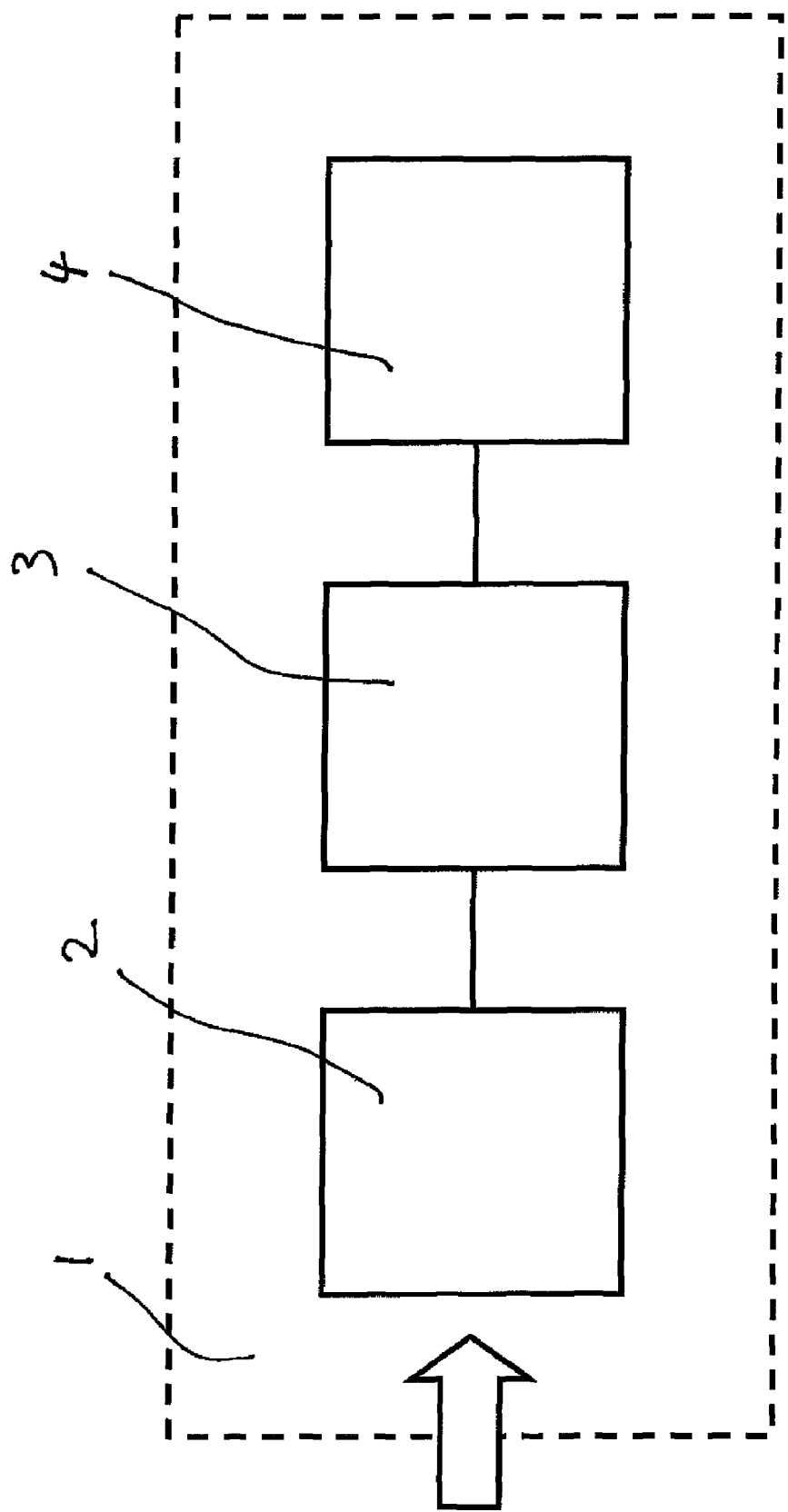
FIG. 1 is a schematic representation of a device for the texturing an object of a virtual three-dimensional geometric model.

FIG. 1 shows a schematic representation of a device for the texturing of one or multiple objects if a virtual three-dimensional geometric model based on spatially localized image data. Using appropriate hardware and software, a computer system 1 such as a personal computer, for example, is implemented. The system 1 includes a facet data generating device 2, which is configured to generate facet data from the geometric data of three-dimensional models. The facet data are then used in a texture data generating device 3 to generate texture data. The facet data and the texture data will then be supplied for a textured three-dimensional representation using an output device 4, for example, to be stored and/or to be outputted to a display device.

Figure 2:
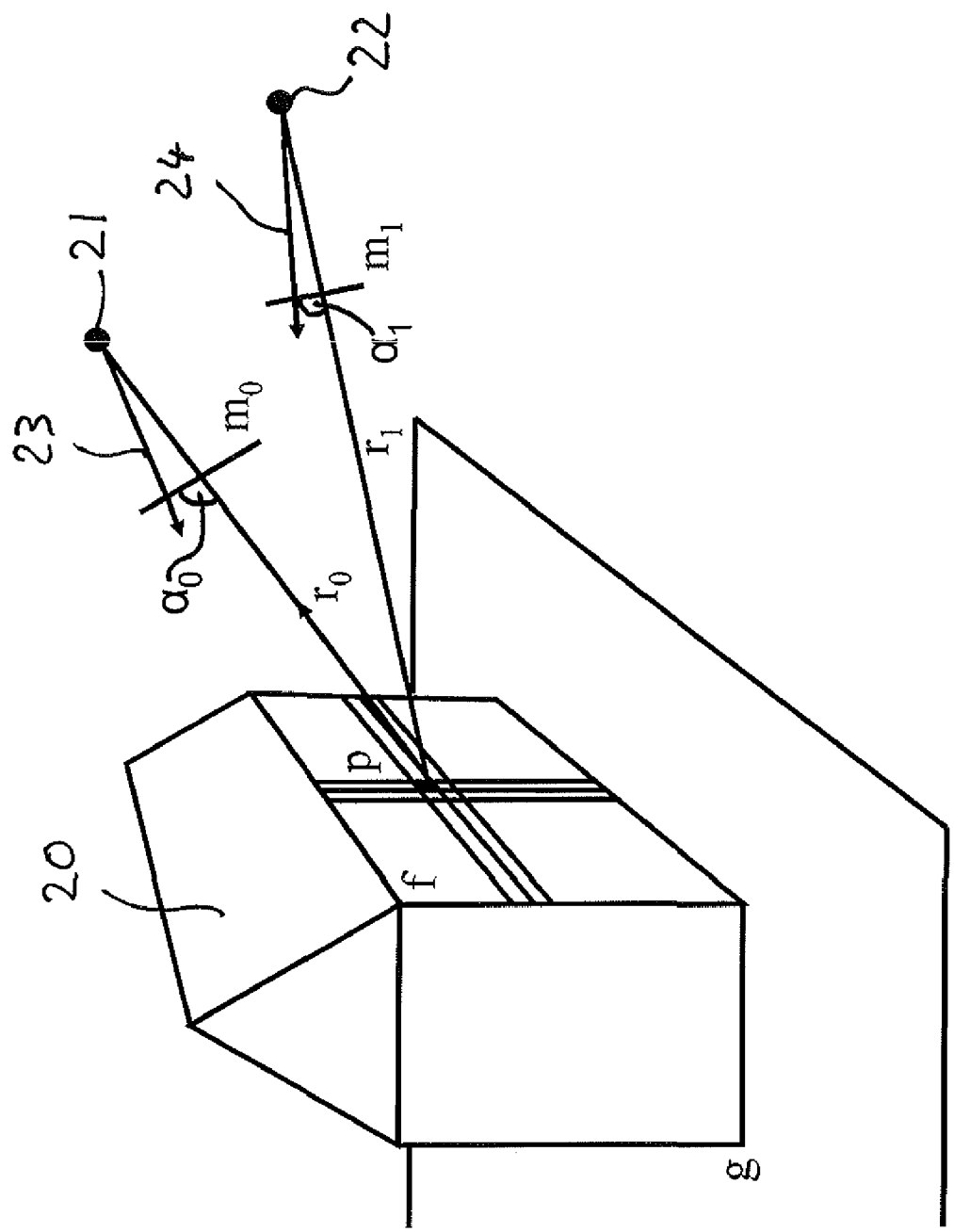
FIG. 2 is a schematic representation illustrating a technique for the texturing an object of a virtual three-dimensional geometric model.
Figure 3:
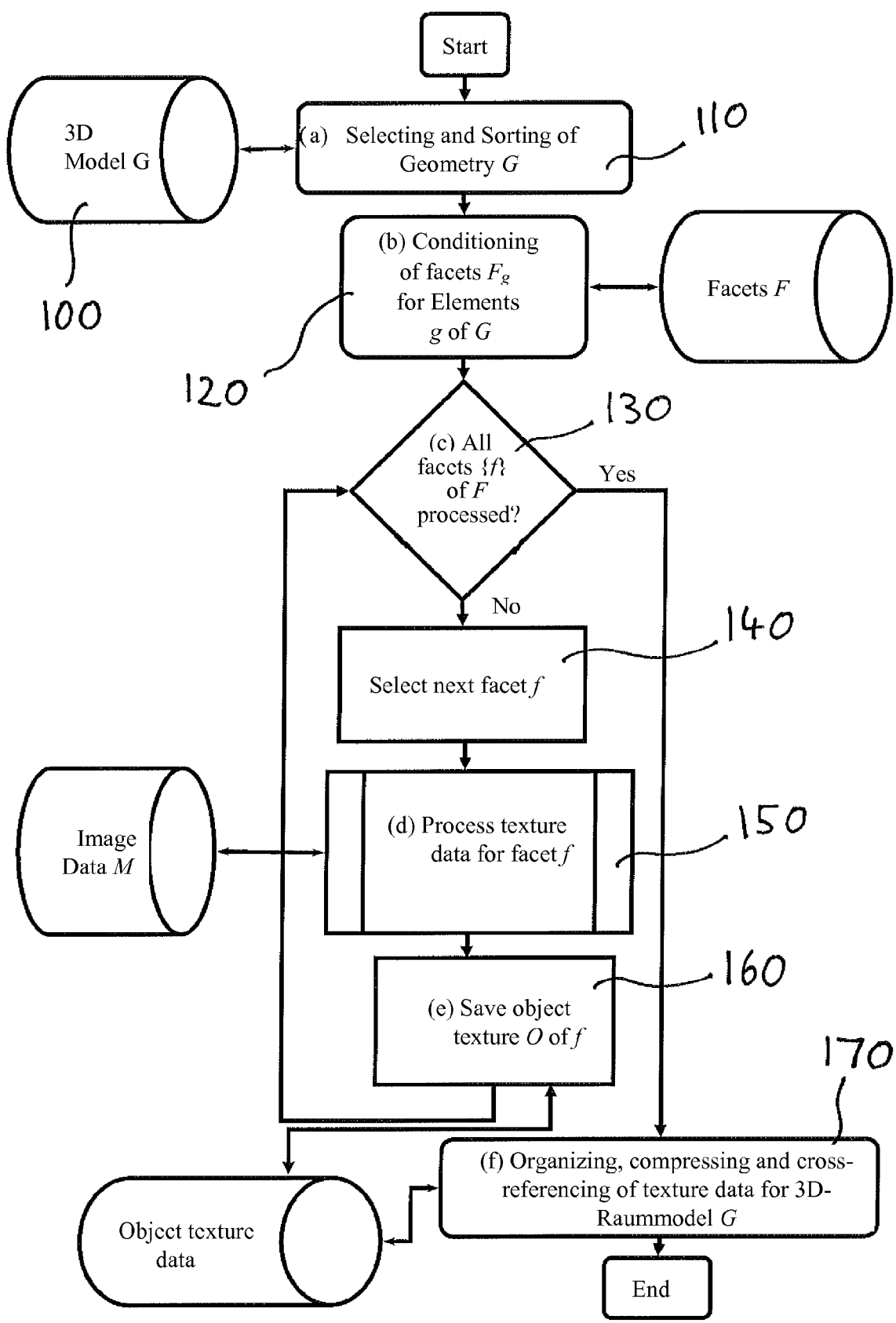
FIG. 3 shows a flowchart for the texturing of an object of a virtual three-dimensional geometric model.
Figure 4:
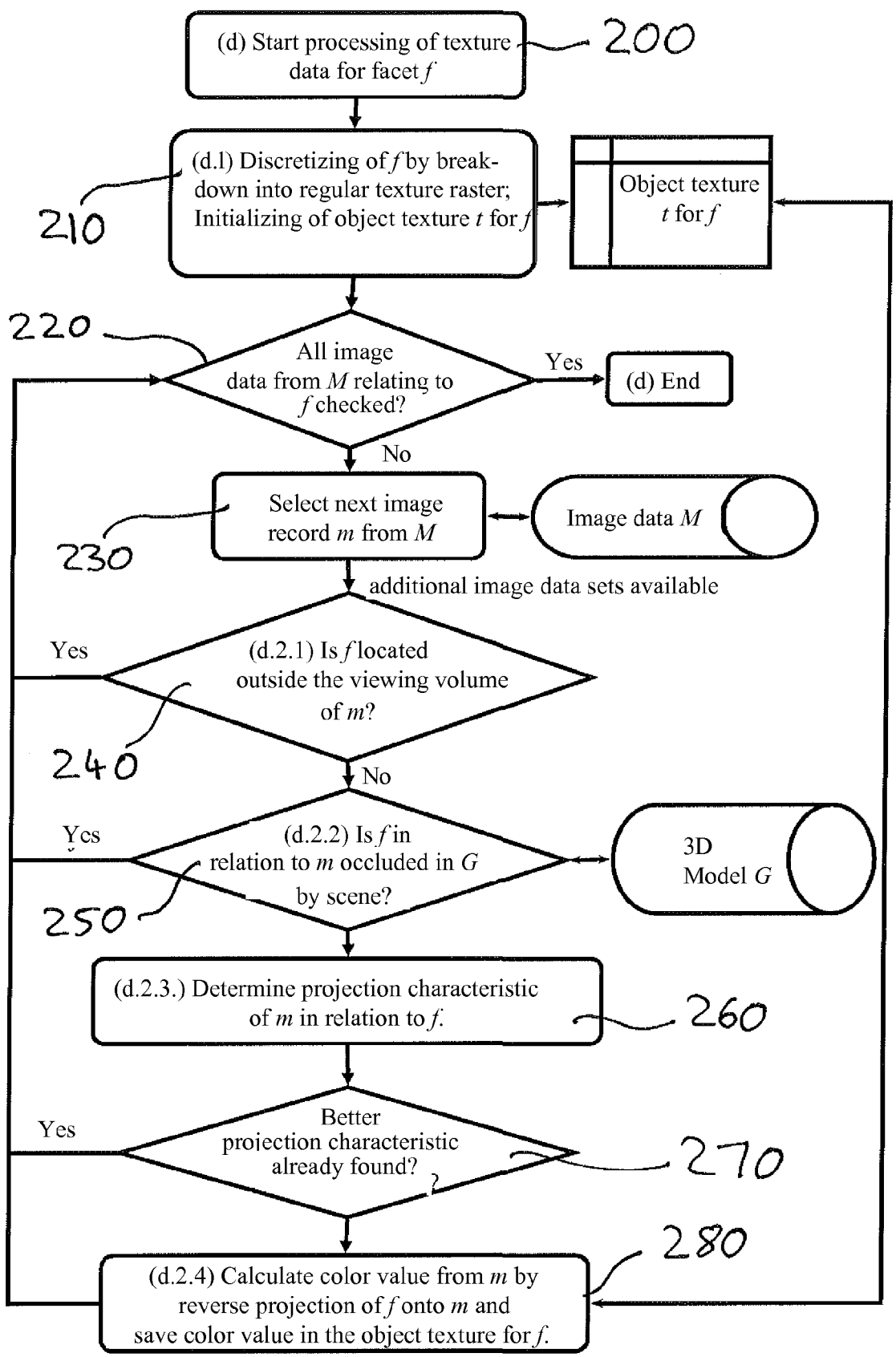
FIG. 4 shows a flow chart of an example process for the generation of texture data.

Implementations of processes for the texturing of a virtual three-dimensional geometric model based on spatially localized image data using the device from FIG. 1 are shown in FIGS. 2-4.

FIG. 2 shows a schematic representation of an object in which a procedure for the texturing of the object of a virtual three-dimensional geometric model based on spatially localized image data is effected. In particular, shown is a 3D object 20 with facets f, which can be separated into fragments p. Shown for the images m0 and m1 belonging to the 3D object 20 are a projection center 21, 22 and a projection direction 23, 24.

According to FIG. 3, in one step 100 model data are provided for a three-dimensional geometric model, for a configuration with one or multiple objects, which is also called 3D model, e.g. a 3D building model or a 3D infrastructure model of virtual 3D spatial models. A quantity of image data M={m} is available representing spatially localized images m for the entire configuration with the one or the multiple objects or at least parts thereof in digitalized form. For example, such images of city districts or territories are captured from airplanes in the form of tilted images (oblique projections). Today, extensive collections of such images exist in digital images in databases. Known respectively for the spatial localization of the amount of images M, i.e. the hereby represented images, are one projection center with 3D coordinates and one projection direction.

The resolution, dimensions and channels of the image as well as the techniques for the acquisition of the image can be selected at will. The model data for the three-dimensional geometric model data for the three-dimensional geometric model are provided by a computer graphic scenario encoded in the formats of Collada, VRML, X3D, CityGML, for example.

As shown in FIG. 3, a number of 3D geometry objects G={g} are selected from the model data in step 110. The data may be selected based on a certain type of object. All 3D building models of a virtual 3D city model of a certain district may be selected, for example. The sequence, in which the selected 3D geometries G can be processed, can be selected at will. For example, all selected 3D building models could be sorted by street and house number.

Object surfaces called facets $F_g$ will be conditioned for all 3D geometry objects in a step 120. Conditioning includes the extraction of polygons from the 3D geometry objects g as well as the unique identification of each facet through referencing each assigned 3D geometry object. For example, all outer wall models of a 3D building model could be extracted in the form of polygons. The conditioned facets F associated with the 3D geometry objects G form relevant object surfaces of the 3D model, for which subsequently object textures will be generated, which is explained below in greater detail. The facets used in this procedure can be obtained directly from the polygons or free form surfaces in the 3D geometry object by recursive segmentation of existing polygons, for example, until all polygons are smaller than a specified maximum surface. Prior to that, a 3D geometry object can be simplified by removing lower rank geometries or geometries that are divided into small sections.

Steps 130 through 160 are then used to generate, for the facets F, a number of object textures T={t} from the image data M. The processing sequence of the facets can be selected at will. In order to optimize access to the image data, the facets will be sorted in a spatially coherent manner. For this purpose, the facets are sorted according to their spatial position so that facets located close to each other in space are also close in their order.

After facets for all assigned texture data have been generated, step 170 according to FIG. 3 is used to store the total number of object textures T={t} calculated for the 3D geometry objects G together with references to the facets F and the 3D geometry objects G. For this purpose, the texture data T are converted into standard image formats, optionally compressed and optionally organized in texture atlases. Simultaneously, the model data for the 3D model in the form of G are upgraded by references to the object textures T.

The process of generating the object textures T are explained in greater detail with reference to FIG. 4. For each facet f from the number of facets F={f} a corresponding surface texture f is calculated from the image data M. After initializing the processing in step 200, the surface of a selected facet f is discretized in step 210. In doing so, the facet is broken down into a regular raster whose elements form a number of fragments P={p} of the corresponding texture t. The granularity of the breakdown can generally be selected at will.

The granularity determines the 3D resolution of the generated object textures and generally depends on the application. The facets are always broken down based on object space metrics, i.e. in reference to the size of an object in the virtual 3D model, in order to achieve a uniform resolution for all of the object textures of the 3D model. For example, for the facade of a 3D building model a raster with a resolution of 25 cm×25 cm can be selected, wherein the "cm" unit of measure refers to the size of the facades in the virtual 3D model. The resulting raster cells are technically texture elements (texels) of the object texture of the selected facet f.

In steps 220 to 280, all fragments {p} of a facet f are processed one after the other. The order of the fragments can be selected at will which means, for example, that the raster fragments can be processed by columns or by rows. During the processing a fragment p is initialized first (with a "no data value"). Then all images {m} are checked one by one as is explained below in greater detail.

In step 240, it is checked if the most recently processed fragment is part of the visible volume of the current image. If the fragment f is not located within the visible volume of the current image m, the process moves on to the next image. If yes, the process is continued with step 250.

In step 250, the most recently processed fragment is checked for potential occlusion by scenario geometries (occlusion test). If another 3D geometry object is located between the fragment f and the projection center of the analyzed set of image data then the fragment is occluded by this 3D geometry object and the process moves on to the next image. Otherwise, the process continues with step 260.

Step 260 is used to determine a projection characteristic m in reference to the most recently processed fragment f. For this purpose, a viewing angle α for the selected fragment between a plane of the image and a plane of the facet, to which the fragment belongs, is determined. If the viewing angle α, which may be between 0° and 90°, is greater than the viewing angle for the selected fragment of another, previously analyzed image, i.e. if the currently analyzed image has a better angle, then a color value from the currently analyzed image will be determined for the selected fragment. Subsequently, a color value projection characteristic (p.c.) is determined for the set of image data M={m} for the selected fragment p. For this purpose, the fragment of the set of image data M={m} is projected back. After that, inside a surface of the set of image data, which is created by the rear projection, a region occluded by this surface is being sampled (using "texture sampling"), and the color value p.c. is calculated as the mean color value of the sampled values. The mean color value and the angle α of the analyzed image are stored.

In step 280, the synthesized object texture t is stored as a raster record. This file represents the object texture for the facet f of 3D geometry g.

The described procedure can, for example, be implemented by the following programming sequence:

```
For all geometries g from G {
    for all facets f of g {
        divide f into fragments {p}
        initialize associated texture t
        for all fragments p of f {
            p.c = no-data
            a-max = no-angle
            for all m from M {
                ray r := ray(p, projection center(m))
                if( r does not intersect with viewing volume of m)
                discard m;
                if( r intersects other geometry as g) discard m;
                determine viewing angle a := angle(plane(m),
                plane(p))
                if(a <= a-max) discard m;
                p.c <-- textursampling(r, p, m)
                a-max <-- a
            }
            save p.c in t
        }
        save t as image file to f of g
    }
}
```

In comparison to the general state of the art, this procedure has extensive advantages, i.e. not only in the embodiment described above. Its different embodiments work initially with a randomly distributed number of spatially localized sets of image data, i.e. all images that are spatially localized can be included into the calculation. In particular, the procedure does not require the even distribution of the images records or for them to be aligned in a specific projection direction.

Another advantage is the fact that the procedure is able to work with hybrid image input data. For example, combinations of data of aerial images, satellite images and ground images can be analyzed. This allows the procedure to use heterogeneous image data in the determination of the ideal object textures.

In addition, the procedure explained above offers in contrast to known procedures for the generation of texturing data, in particular those in the area of photogrammetry, advantages which are created by the fact that is works in reverse: instead of determining the only best image for a given facet and to cut out the object texture and to equalize it in respect to perspective and geometry, the ideal set of image data for each individual fragment of a facet is selected out of a total of spatially localized image data and the color information contained therein is assigned to the fragment by texture sampling.

The fine granular checking of 3D occlusions for each individual fragment of a generated object texture might be considered an additional advantage of the procedure. The occluded areas of a facet in reference to a single set of image data can thus be detected and filled in with in formation from other sets of image data.

Finally, this procedure cannot only be used for planar and not only for right angle facets but generally for any facet having a mathematically well defined surface with, however, at least one surface normal on each fragment. This makes this procedure universally applicable to all object geometries.

The systems and methods disclosed herein may use data signals conveyed using networks (e.g., local area network, wide area network, internet, etc.), fiber optic medium, carrier waves, wireless networks (e.g., wireless local area networks, wireless metropolitan area networks, cellular networks, etc.), etc. for communication with one or more data processing devices (e.g., mobile devices). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

The invention claimed is:

1. A method performed by a system of one or more computers, the method comprising:
generating, by the one or more computers, facet data from three-dimensional geometric model data, the facet data representing one or more object surfaces of the object;
generating, by the one or more computers, texture data representing a respective surface texture for each object surface of the object using the facet data, and
storing, by the one or more computers, the facet data and texture data for the textured three-dimensional representation of the object, wherein generating the texture data for a particular object surface comprises:
discretizing the particular object surface by creating one or more surface fragments corresponding to the particular object surface;
for each surface fragment, selecting a respective image from a respective spatially localized set of image data representing one or more images corresponding to the object, wherein the selected respective image has a viewing angle between a plane of the selected respective image and the respective surface that is greater than or equal to the viewing angle of any other image of the one or more images, wherein selecting the selected respective image includes, for each image of the one or more images, determining whether the surface fragment is part of a visible volume of the image by determining whether a ray between the surface fragment and a projection center of the image intersects the visible volume of the image, and if the surface fragment is not part of the visible volume, discarding the image; and
for each surface fragment, generating a respective fragment color value for the respective surface fragment using the selected respective image by projecting the respective surface fragment into a respective projection area of the respective spatially localized set of image data, and by deducting the respective fragment color value from color information of the respective projection area;
wherein generating the texture data is based at least partly on the fragment color values assigned to the surface fragments of the object surfaces.

2. The method of claim 1, wherein generating texture data further comprises detecting the object surfaces in the spatially localized set of image data.

3. The method of claim 2, wherein detecting the object surfaces in the set of image data further comprises checking for occlusions of object surfaces in the spatially localized set of image data.

4. The method of claim 1, wherein generating texture data further comprises capturing a specific projection characteristic for the object surfaces, and wherein the texture data generated includes the respective viewing angle for the object surfaces.

5. The method according to claim 1, wherein the fragment color value is determined using a mean fragment value by averaging the color values of multiple pixels within the projection area.

6. The method according to claim 1, wherein generating of facet data comprises spatially coherent sorting of the object surfaces.

7. The method according to claim 1, wherein storing the facet data and the texture data further comprises converting the texture data into a standard image format.

8. A system of one or more computers configured to perform operations comprising:
   generating facet data from three-dimensional geometric model data of an object, the facet data representing one or more object surfaces of the object;
   generating texture data representing a respective surface texture for each object surface of the object using the facet data, and
   storing the facet data and the texture data for a textured three-dimensional representation of the object, wherein generating the texture data for a particular object surface comprises:
      discretizing the particular object surface by creating one or more surface fragments corresponding to the particular object surface;
      for each surface fragment, selecting a respective image from a respective spatially localized set of image data representing one or more images corresponding to the object, wherein the selected respective image has a viewing angle between a plane of the selected respective image and the respective surface fragment that is greater than or equal to the viewing angle of any other image of the one or more images; wherein selecting the selected respective image includes, for each image of the one or more images, determining whether the surface fragment is part of a visible volume of the image by determining whether a ray between the surface fragment and a projection center of the image intersects the visible volume of the image, and if the surface fragment is not part of the visible volume, discarding the image; and
      for each surface fragment, generating a respective fragment color value for the respective surface fragment using the selected respective image by projecting the respective surface fragment into a respective projection area of the respective spatially localized set of image data, and by deducting the respective fragment color value from color information of the respective projection area;
      wherein generating the texture data is based at least partly on the fragment color values assigned to the surface fragments of the object surfaces.

9. The system of claim 8, wherein generating texture data further comprises detecting the object surfaces in the spatially localized set of image data.

10. The system of claim 9, wherein detecting the object surfaces in the set of image data further comprises checking for occlusions of object surfaces in the spatially localized set of image data.

11. The system of claim 8, wherein generating texture data further comprises capturing a specific projection characteristic for the object surfaces, and wherein the texture data generated includes the respective viewing angle for the object surfaces.

12. The system according to claim 8, wherein the fragment color value is determined using a mean fragment value by averaging the color values of multiple pixels within the projection area.

13. The system according to claim 8, wherein generating of facet data comprises spatially coherent sorting of the object surfaces.

14. The system according to claim 8, wherein storing the facet data and the texture data further comprises converting the texture data into a standard image format.

15. A storage device having instructions stored thereon that, when executed by a system of one or more computers, cause the system to perform operations comprising:
   generating facet data from three-dimensional geometric model data of an object, the facet data representing one or more object surfaces of the object;
   generating texture data representing a respective surface texture for each object surface of the object using the facet data, and
   storing the facet data and the texture data for a textured three-dimensional representation of the object, wherein generating the texture data for a particular object surface comprises:
      discretizing the particular object surface by creating one or more surface fragments corresponding to the particular object surface;
      for each surface fragment, selecting a respective image from a respective spatially localized set of image data representing one or more images corresponding to the object, wherein the selected respective image has a viewing angle between a plane of the selected respective image and the respective surface fragment that is greater than or equal to the viewing angle of any other image of the one or more images; wherein selecting the selected respective image includes, for each image of the one or more images, determining whether the surface fragment is part of a visible volume of the image by determining whether a ray between the surface fragment and a projection center of the image intersects the visible volume of the image, and if the surface fragment is not part of the visible volume, discarding the image; and
      for each surface fragment, generating a respective fragment color value for the respective surface fragment using the selective respective image by projecting the respective surface fragment into a respective projection area of the respective spatially localized set of image data, and by deducting the respective fragment color value from color information of the respective projection area;
      wherein generating the texture data is based at least partly on the fragment color values assigned to the surface fragments of the object surfaces.

16. The storage device of claim 15, wherein generating texture data further comprises detecting the object surfaces in the spatially localized set of image data.

17. The storage device of claim 16, wherein detecting the object surfaces in the set of image data further comprises checking for occlusions of object surfaces in the spatially localized set of image data.

18. The storage device of claim 15, wherein generating texture data further comprises capturing a specific projection characteristic for the object surfaces, and wherein the texture data generated includes the respective viewing angle for the object surfaces.

19. The storage device according to claim 15, wherein the fragment color value is determined using a mean fragment value by averaging the color values of multiple pixels within the projection area.

20. The storage device according to claim 15, wherein generating of facet data comprises spatially coherent sorting of the object surfaces.

21. The storage device according to claim 15, wherein storing the facet data and the texture data further comprises converting the texture data into a standard image format.

* * * * *

UNITED STATES PATENT AND TRADEMARK OFFICE
CERTIFICATE OF CORRECTION

PATENT NO. : 8,358,316 B2
APPLICATION NO. : 12/267341
DATED : January 22, 2013
INVENTOR(S) : Jurgen Dollner It is certified that error appears in the above-identified patent and that said Letters Patent is hereby corrected as shown below:

In the Claims:

Claim 8, Column 7, Line 30 – delete "images;" and insert -- images, --, therefor.

Claim 15, Column 8, Line 32 – delete "images;" and insert -- images, --, therefor.

Signed and Sealed this
Sixteenth Day of April, 2013

Teresa Stanek Rea
*Acting Director of the United States Patent and Trademark Office*